United States Patent Office 3,256,063
Patented June 14, 1966

3,256,063
METHOD OF STABILIZING LIQUID SULFUR TRIOXIDE AND PRODUCT
Thomas G. Kane, Wilmington, Del., assignor to E. I. du Pont de Nemours and Company, Wilmington, Del., a corporation of Delaware
No Drawing. Filed Jan. 21, 1963, Ser. No. 252,613
14 Claims. (Cl. 23—174)

This invention relates to the stabilization of liquid sulfur trioxide and high strength oleums.

As is well known, sulfur trioxide exists in three forms having melting points of 17° C., 32.5° C., and 62° C. The polymeric form melting at 62° C., alpha $SO_3$, is the stable form under ordinary conditions. Upon freezing or even after standing at room temperature a short time the liquid gamma form (M.P. 17° C.) ordinarily changes to the solid forms.

This transition of liquid sulfur trioxide to solid polymeric forms is extremely undesirable from the standpoint of ease in handling and usage. In most instances, prior to usage the solidified sulfur trioxide must be remelted by heating to temperatures up to about 100° C., thereby developing dangerous high pressures in some instances.

High strength oleums of free sulfur trioxide strengths upward of about 80% tend to polymerize in a similar fashion. The degree of polymerization depends chiefly upon the sulfur trioxide strength of the oleum and the temperatures at which the material is stored. While polymerization will not proceed sufficiently far in some of these oleums to give a completely solid product, the degree of polymerization increases on the passage of time so that the ultimate mass will ordinarily contain solid forms of $SO_3$ in suspension in the oleum. This polymerization of sulfur trioxide in high strength oleums is also highly undesirable.

Although some prior art stabilizers for liquid sulfur trioxide and high strength oleums have been somewhat satisfactory under some conditions, most prior art stabilizers suffer the disadvantage of being useful only within a very narrow concentration range in the sulfur trioxide they are stabilizing. According to the present invention, I have found a narrow class of compounds which are highly useful over an extremely broad range. This enables them to be used with outstanding effectiveness and with greatly diminished criticality of concentration. Furthermore, the class of compounds I have discovered to be effective stabilizers for liquid sulfur trioxide provide excellent stabilization even at reduced temperatures over a long period of time.

According to the present invention I have discovered that a narrow group of lower alkyl esters of aliphatic carboxylic acids are effective stabilizers for sulfur trioxide. These lower alkyl esters have the formula:

$$R^1\text{—C—}O_2\text{—R}$$

where R is lower alkyl, i.e., of 1, 2, 3 or 4 carbon atoms, and preferably methyl or ethyl; and $R^1$ is (1) Hydrogen
(2) Alkyl of 1 through 3 carbons
(3) —C(O)CH$_3$
(4) —CH=CH$_2$
(5) —C(CH$_3$)=CH$_2$
(6) —C(OCH$_3$)=CH$_2$
(7) —CH$_2$OH
(8) —CH$_2$OCH$_3$
(9) —CH$_2$C(O)CH$_3$
(10) —CH$_2$—COOR$^2$, or
(11) —CH=CH—COOR$^2$ where $R^2$ can be the same or different as R and is likewise lower alkyl, i.e., of 1 through 4 carbons, and preferably methyl or ethyl. $R^1$ is preferably one of the groups numbered 3, 4, 5, 6, 8 and 9 in the above list.

It will be noted from the above description of the invention that the preferred stabilizers I have discovered are the methyl and ethyl esters of peruvic, acrylic, methacrylic, alpha-methoxyacrylic, methoxyacetic and acetoacetic acids.

The stabilizers of the present invention can be used in an amount ranging from minor amounts up to about 5 weight percent of stabilizer based on the weight of the stabilized material. The selection of the particular amount of stabilizer to be used under a particular set of circumstances can be readily selected by persons skilled in the art, and will depend upon the particular stabilizer selected, the degree of stability to be desired, the amount of moisture present or likely to become present in the sulfur trioxide, the temperature to which the stabilized composition is expected to be exposed, the duration of storage, and the like. In general, as will be readily understood by persons in this art, an adequate concentration will fall within the range from about 0.05 to about 2% by weight of the sulfur trioxide being stabilized.

The stabilizers of this invention are particularly advantageous in their compatibility with other stabilizers and in their high solubility in liquid sulfur trioxide.

In order that the invention can be better understood, the following examples are given in addition to those set forth above:

Example 1

Methylmethacrylate in an amount of 0.1% by weight is added to anhydrous liquid sulfur trioxide and the mixture stored at room temperature for one week. During that period of time, there is no tendency for solid polymers with sulfur trioxide to form. The stabilized mixture is then frozen at —18° C. It remelts readily upon reheating to room temperature.

Additional examples

Using amounts of stabilizer within range from about 0.05 to about 5 weight percent, and specifically such amounts as 0.05%, 0.08%, 0.1%, 0.2%, 0.4%, 0.6%, 0.8%, 1.0%, 1.5%, 2.0%, and 4.0%, the following exemplary compounds provide effective stabilization upon admixture with anhydrous liquid sulfur trioxide as well as liquid sulfur trioxide containing 0.5% sulfuric acid or 5% sulfuric acid. The stabilized mixtures exhibit excellent lack of tendency towards polymerization and solidification even upon extended storage and subjection to raised and lowered temperature conditions:

| Example: | Stabilizer |
|---|---|
| 2 | Methyl formate. |
| 3 | Ethyl formate. |
| 4 | N-propyl formate. |
| 5 | Isopropyl formate. |
| 6 | n-Butyl formate. |
| 7 | Sec-butyl formate. |
| 8 | Tert-butyl formate. |
| 9 | Acetic acid, methyl ester. |

| | |
|---|---|
| 10 | Acetic acid, ethyl ester. |
| 11 | Acetic acid, n-propyl ester. |
| 12 | Acetic acid, isopropyl ester. |
| 13 | Acetic acid, n-butyl ester. |
| 14 | Acetic acid, sec-butyl ester. |
| 15 | Acetic acid, tert-butyl ester. |
| 16 | Propionic acid, methyl ester. |
| 17 | Propionic acid, ethyl ester. |
| 18 | Propionic acid, n-propyl ester. |
| 19 | Propionic acid, isopropyl ester. |
| 20 | Propionic acid, n-butyl ester. |
| 21 | Propionic acid, sec-butyl ester. |
| 22 | Propionic acid, tert-butyl ester. |
| 23 | Butyric acid, methyl ester. |
| 24 | Butyric acid, ethyl ester. |
| 25 | Butyric acid, n-propyl ester. |
| 26 | Butyric acid, isopropyl ester. |
| 27 | Butyric acid, n-butyl ester. |
| 28 | Butyric acid, sec-butyl ester. |
| 29 | Butyric acid, tert-butyl ester. |
| 30 | Peruvic acid, methyl ester. |
| 31 | Peruvic acid, ethyl ester. |
| 32 | Peruvic acid, n-propyl ester. |
| 33 | Peruvic acid, isopropyl ester. |
| 34 | Peruvic acid, n-butyl ester. |
| 35 | Peruvic acid, sec-butyl ester. |
| 36 | Peruvic acid, tert-butyl ester. |
| 37 | Acrylic acid, methyl ester. |
| 38 | Acrylic acid, ethyl ester. |
| 39 | Acrylic acid, n-propyl ester. |
| 40 | Acrylic acid, isopropyl ester. |
| 41 | Acrylic acid, n-butyl ester. |
| 42 | Acrylic acid, sec-butyl ester. |
| 43 | Acrylic acid, tert-butyl ester. |
| 44 | Methacrylic acid, ethyl ester. |
| 45 | Methacrylic acid, n-propyl ester. |
| 46 | Methacrylic acid, isopropyl ester. |
| 47 | Methacrylic acid, n-butyl ester. |
| 48 | Methacrylic acid, sec-butyl ester. |
| 49 | Methacrylic acid, tert-butyl ester. |
| 50 | Alpha-methoxyacrylic acid, methyl ester. |
| 51 | Alpha-methoxyacrylic acid, ethyl ester. |
| 52 | Alpha - methoxyacrylic acid, n-propyl ester. |
| 53 | Alpha - methoxyacrylic acid, isopropyl ester. |
| 54 | Alpha-methoxyacrylic acid, n-butyl ester. |
| 55 | Alpha - methoxyacrylic acid, sec-butyl ester. |
| 56 | Alpha - methoxyacrylic acid, tert-butyl ester. |
| 57 | Hydroxyacetic acid, methyl ester. |
| 58 | Hydroxyacetic acid, ethyl ester. |
| 59 | Hydroxyacetic acid, n-propyl ester. |
| 60 | Hydroxyacetic acid, isopropyl ester. |
| 61 | Hydroxyacetic acid, n-butyl ester. |
| 62 | Hydroxyacetic acid, sec-butyl ester. |
| 63 | Hydroxyacetic acid, tert-butyl ester. |
| 64 | Methoxyacetic acid, methyl ester. |
| 65 | Methoxyacetic acid, ethyl ester. |
| 66 | Methoxyacetic acid, n-propyl ester. |
| 67 | Methoxyacetic acid, isopropyl ester. |
| 68 | Methoxyacetic acid, n-butyl ester. |
| 69 | Methoxyacetic acid, sec-butyl ester. |
| 70 | Methoxyacetic acid, tert-butyl ester. |
| 71 | Acetoacetic acid, methyl ester. |
| 72 | Acetoacetic acid, ethyl ester. |
| 73 | Acetoacetic acid, n-propyl ester. |
| 74 | Acetoacetic acid, isopropyl ester. |
| 75 | Acetoacetic acid, n-butyl ester. |
| 76 | Acetoacetic acid, sec-butyl ester. |
| 77 | Acetoacetic acid, tert-butyl ester. |
| 78 | Malonic acid, di(methyl ester). |
| 79 | Malonic acid, di(ethyl ester). |
| 80 | Malonic acid, di(n-propyl ester). |
| 81 | Malonic acid, di(isopropyl ester). |
| 82 | Malonic acid, di(n-butyl ester). |
| 83 | Malonic acid, di(sec-butyl ester). |
| 84 | Malonic acid, di(tert-butyl ester). |
| 85 | Maleic acid, di(methyl ester). |
| 86 | Maleic acid, di(ethyl ester). |
| 87 | Maleic acid, di(n-propyl ester). |
| 88 | Maleic acid, di(isopropyl ester). |
| 89 | Maleic acid, di(n-butyl ester). |
| 90 | Maleic acid, di(sec-butyl ester). |
| 91 | Maleic acid, di(tert-butyl ester). |
| 92 | Malonic acid, mixed methyl and ethyl diester. |
| 93 | Maleic acid, mixed methyl and ethyl diester. |

The invention claimed is:

1. The method of stabilizing liquid sulfur trioxide and high-strength oleums against polymerization which comprises incorporating therein a stabilizing amount of at least one compound selected from the class represented by the formula:

$$R^1—C—O_2—R$$

where R is alkyl of 1 through 4 carbon atoms and $R^1$ is selected from the group consisting of the following:

(1) hydrogen
(2) alkyl of 1 through 3 carbons
(3) $—C(O)CH_3$
(4) $—CH=CH_2$
(5) $—C(CH_3)=CH_2$
(6) $—C(OCH_3)=CH_2$
(7) $—CH_2OH$
(8) $—CH_2OCH_3$
(9) $—CH_2C(O)CH_3$
(10) $—CH_2COOR^2$, and
(11) $—CH=CH—COOR^2$ and where $R^2$ is alkyl of 1 through 4 carbon atoms.

2. The method as set forth in claim 1 wherein said compound is peruvic acid, methyl ester.

3. The method as set forth in claim 1 wherein said compound is acrylic acid, methyl ester.

4. The method as set forth in claim 1 wherein said compound is methacrylic acid, methyl ester.

5. The method as set forth in claim 1 wherein said compound is alpha-methoxyacrylic acid, methyl ester.

6. The method as set forth in claim 1 wherein said compound is methoxyacetic acid, methyl ester.

7. The method as set forth in claim 1 wherein said compound is acetoacetic acid, methyl ester.

8. A composition containing a material selected from the group consisting of sulfur trioxide and oleum of $SO_3$ strength such that $SO_3$ polymers tend to form and, in an amount sufficient to effect stabilization of said material, at least one compound selected from the class of the formula:

$$R^1—C—O_2—R$$

where R is alkyl of 1 through 4 carbon atoms and $R^1$ is selected from the group consisting of the following:

(1) hydrogen
(2) alkyl of 1 through 3 carbons
(3) $—C(O)CH_3$
(4) $—CH=CH_2$
(5) $—C(CH_3)=CH_2$
(6) $—C(OCH_3)=CH_2$
(7) $—CH_2OH$
(8) $—CH_2OCH_3$
(9) $—CH_2C(O)CH_3$
(10) $—CH_2COOR^2$, and
(11) $—CH=CH—COOR^2$ and where $R^2$ is alkyl of 1 through 4 carbons atoms.

9. A composition as set forth in claim 8 wherein said compound is peruvic acid, methyl ester.

10. A composition as set forth in claim 8 wherein said compound is acrylic acid, methyl ester.

11. A composition as set forth in claim 8 wherein said compound is methacrylic acid, methyl ester.

12. A composition as set forth in claim 8 wherein said compound is alpha-methoxyacrylic acid, methyl ester.

13. A composition as set forth in claim 8 wherein said compound is methoxyacetic acid, methyl ester.

14. A composition as set forth in claim 8 wherein said compound is acetoacetic acid, methyl ester.

References Cited by the Examiner
FOREIGN PATENTS
139,308   5/1960   Russia.

BENJAMIN HENKIN, *Primary Examiner.*

MAURICE A. BRINDISI, *Examiner.*

R. M. DAVIDSON, *Assistant Examiner.*